United States Patent
Hoshino et al.

(10) Patent No.: US 11,312,058 B2
(45) Date of Patent: Apr. 26, 2022

(54) LIQUID-CONTAINING CONTAINER MANUFACTURING METHOD

(71) Applicant: YOSHINO KOGYOSHO CO., LTD., Tokyo (JP)

(72) Inventors: Hideaki Hoshino, Tokyo (JP); Kenichi Suyama, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 169 days.

(21) Appl. No.: 16/646,272

(22) PCT Filed: Aug. 13, 2018

(86) PCT No.: PCT/JP2018/030199
§ 371 (c)(1),
(2) Date: Mar. 11, 2020

(87) PCT Pub. No.: WO2019/058813
PCT Pub. Date: Mar. 28, 2019

(65) Prior Publication Data
US 2021/0362394 A1    Nov. 25, 2021

(30) Foreign Application Priority Data

Sep. 20, 2017  (JP) .............................. JP2017-180621
Sep. 20, 2017  (JP) .............................. JP2017-180622

(51) Int. Cl.
*B29C 49/46*     (2006.01)
*B29C 49/12*     (2006.01)
(Continued)

(52) U.S. Cl.
CPC .............. *B29C 49/46* (2013.01); *B29C 49/12* (2013.01); *B29C 2049/4664* (2013.01); *B29K 2067/003* (2013.01); *B29L 2031/7158* (2013.01)

(58) Field of Classification Search
CPC ............ B29C 49/46; B29C 2049/4655; B29C 2049/465; B29C 2049/4664;
(Continued)

(56) References Cited

U.S. PATENT DOCUMENTS

| 9,610,744 B2 * | 4/2017 | Sato ........................ B29C 49/46 |
| 2011/0135778 A1 * | 6/2011 | Andison ................. B29C 49/46 425/524 |

(Continued)

FOREIGN PATENT DOCUMENTS

| CN | 104136195 A | 11/2014 |
| CN | 104684708 A | 6/2015 |

(Continued)

OTHER PUBLICATIONS

Oct. 9, 2018 International Search Report issued in International Patent Application No. PCT/JP2018/030199.
Apr. 28, 2021 Extended Search Report issued in European Patent Application No. 18859579.7.
Apr. 20, 2021 Office Action issued in Chinese Patent Application No. 201880059883.X.

*Primary Examiner* — Robert B Davis
(74) *Attorney, Agent, or Firm* — Oliff PLC

(57) ABSTRACT

A liquid-containing container manufacturing method includes: a liquid blow molding step of molding a preform into a liquid-containing container of a shape along an inner surface of a mold for blow molding, by supplying a liquid pressurized from a supply path into the preform in a state in which a blow nozzle engages with a mouth part of the preform; and a headspace formation step of forming a headspace in the liquid-containing container, by operating a pressurized liquid supply source in a suction direction to (Continued)

discharge the liquid from inside the liquid-containing container through the supply path, thereafter closing the supply path, and discharging the liquid from inside the liquid-containing container through a discharge port of a discharge rod extending into the liquid-containing container through the blow nozzle.

9 Claims, 8 Drawing Sheets

(51) Int. Cl.
    *B29K 67/00*       (2006.01)
    *B29L 31/00*       (2006.01)

(58) Field of Classification Search
    CPC .... B29C 2049/1228; B29C 2049/5803; B29C 2049/5893
    See application file for complete search history.

(56) References Cited

U.S. PATENT DOCUMENTS

| | | | |
|---|---|---|---|
| 2016/0200029 A1* | 7/2016 | Shiokawa | B29C 49/46 425/524 |
| 2020/0171733 A1* | 6/2020 | Shiokawa | B29C 49/4289 |
| 2021/0178652 A1* | 6/2021 | Hoshino | B29C 49/46 |

FOREIGN PATENT DOCUMENTS

| | | |
|---|---|---|
| DE | 10 2013 101 775 A1 | 8/2014 |
| JP | 2013-132861 A | 7/2013 |
| JP | 2013-541448 A | 11/2013 |
| JP | 5806929 B2 | 11/2015 |
| JP | 2017-094686 A | 6/2017 |
| WO | 2017/090339 A1 | 6/2017 |

\* cited by examiner

LIQUID-CONTAINING CONTAINER MANUFACTURING METHOD

TECHNICAL FIELD

The present disclosure relates to a liquid-containing container manufacturing method of manufacturing a liquid-containing container containing a content liquid from a synthetic resin-made preform.

BACKGROUND

Synthetic resin-made containers such as bottles made of polypropylene (PP) and bottles made of polyethylene terephthalate (PET) are used to contain, as content liquids, various liquids including beverages, cosmetics, medicines, detergents, and toiletries such as shampoos. Such a container is typically manufactured by blow molding a preform made of a thermoplastic synthetic resin material such as the above-mentioned materials.

As a blow molding method of molding a preform into a container, liquid blow molding using a pressurized liquid instead of pressurized air as a pressurized medium supplied into a preform is known.

For example, PTL 1 describes a liquid blow molding method whereby a synthetic resin-made preform preheated to a temperature at which stretchability is developed is placed in a mold for blow molding and a liquid pressurized to a predetermined pressure is supplied into the preform through a blow nozzle using a pressurizing means such as a pump to mold the preform into a container of a predetermined shape along the cavity of the mold for blow molding.

With this liquid blow molding method, a content liquid to be contained in the container as a product can be used as the liquid supplied into the preform to simultaneously mold the container and fill the container with the content liquid, thus manufacturing a liquid-containing container containing the content liquid. Therefore, a liquid-containing container manufacturing method using liquid blow molding can manufacture a liquid-containing container at low cost, with no need for a step of filling the molded container with the content liquid.

CITATION LIST

Patent Literature

PTL 1: JP 5806929 B2

SUMMARY

Technical Problem

With the conventional liquid blow molding method described above, typically, a headspace of a desired size needs to be formed in the molded container. An example of a method of forming a headspace involves, immediately after molding the liquid-containing container, sucking the liquid inside the container through the blow nozzle using the pump to form negative pressure inside the container, and thereafter opening the inside of the container to the atmosphere to introduce air into the container, thereby forming a headspace. However, the liquid inside the container immediately after molding is in a bubbling state as a result of entraining air that was present inside the preform. With the foregoing method, such bubbling liquid enters the supply path of liquid leading to the blow nozzle. This can cause mixing of air into the supply path, and result in decreases in the stability of molding conditions, the container moldability, and the like.

It could therefore be helpful to provide a liquid-containing container manufacturing method that can manufacture a liquid-containing container to have a predetermined content amount and shape accurately and at low cost.

Solution to Problem

A liquid-containing container manufacturing method according to the present disclosure is a liquid-containing container manufacturing method of manufacturing a liquid-containing container containing a content liquid from a synthetic resin-made preform using a nozzle unit and a mold for blow molding, the nozzle unit having a common path of a liquid extending from a pressurized liquid supply source to a branch, a supply path of the liquid extending from the branch to a blow nozzle, and a discharge path of the liquid extending from the branch to a discharge port of a discharge rod, the liquid-containing container manufacturing method comprising: a liquid blow molding step of molding the preform into the liquid-containing container of a shape along an inner surface of the mold for blow molding, by supplying the liquid pressurized by the pressurized liquid supply source from the supply path into the preform in a state in which the blow nozzle engages with a mouth part of the preform; and a headspace formation step of forming a headspace in the liquid-containing container, by operating the pressurized liquid supply source in a suction direction to discharge the liquid from inside the liquid-containing container through the supply path, thereafter closing the supply path, and discharging the liquid from inside the liquid-containing container through the discharge port of the discharge rod extending into the liquid-containing container through the blow nozzle.

Preferably, in the liquid-containing container manufacturing method according to the present disclosure, in the headspace formation step, the pressurized liquid supply source is operated in the suction direction to discharge the liquid from inside the liquid-containing container through the discharge port of the discharge rod.

Preferably, in the liquid-containing container manufacturing method according to the present disclosure, in the headspace formation step, pressurized gas is introduced into the liquid-containing container to discharge the liquid from inside the liquid-containing container through the discharge port of the discharge rod.

Preferably, the liquid-containing container manufacturing method according to the present disclosure further comprises a rod purge step of emitting the liquid from the discharge port of the discharge rod, in the liquid inside the preform before and/or during molding into the liquid-containing container.

Preferably, in the liquid-containing container manufacturing method according to the present disclosure, in the rod purge step, a whole amount of the liquid discharged from inside the liquid-containing container through the discharge port in the headspace formation step performed previously is emitted from the discharge port.

Preferably, in the liquid-containing container manufacturing method according to the present disclosure, in the rod purge step, the liquid is emitted from the discharge port of the discharge rod, in the liquid.

Preferably, the liquid-containing container manufacturing method according to the present disclosure further comprises an air discharge step of discharging air inside the preform to outside by supplying the liquid into the preform, before the liquid blow molding step.

Preferably, in the liquid-containing container manufacturing method according to the present disclosure, an amount of the liquid discharged from inside the liquid-containing container through the discharge port in the headspace formation step is less than or equal to an inner volume of the discharge path.

Preferably, the liquid-containing container manufacturing method according to the present disclosure further comprises a rod stretching step of stretching the preform in an axial direction by a stretching rod, before or during the liquid blow molding step, wherein the discharge rod is the stretching rod.

Advantageous Effect

It is thus possible to provide a liquid-containing container manufacturing method that can manufacture a liquid-containing container to have a predetermined content amount and shape accurately and at low cost.

DETAILED DESCRIPTION

Figure 1:
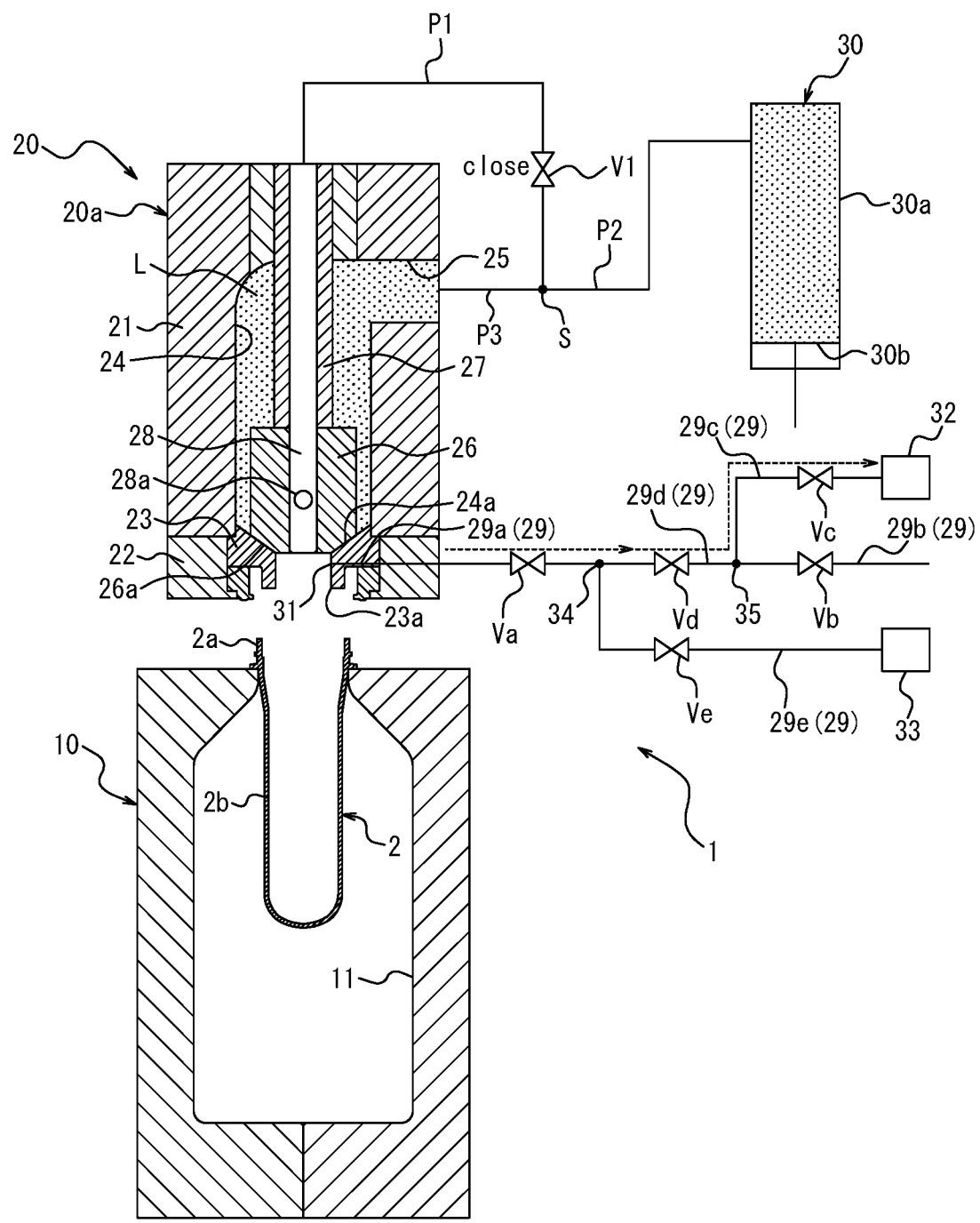
FIG. 1 is an explanatory diagram illustrating an example of a liquid-containing container manufacturing device used in a liquid-containing container manufacturing method which is an embodiment of the present disclosure, in a state in which a standby step is performed.

More detailed description will be given below with reference to the drawings.

A liquid-containing container manufacturing method which is an embodiment of the present disclosure is a liquid-containing container manufacturing method of manufacturing a liquid-containing container containing a content liquid from a synthetic resin-made preform using a nozzle unit and a mold for blow molding, the nozzle unit having a common path of a liquid extending from a pressurized liquid supply source to a branch, a supply path of the liquid extending from the branch to a blow nozzle, and a discharge path of the liquid extending from the branch to a discharge port of a discharge rod, the liquid-containing container manufacturing method comprising: a liquid blow molding step of molding the preform into the liquid-containing container of a shape along an inner surface of the mold for blow molding, by supplying the liquid pressurized by the pressurized liquid supply source from the supply path into the preform in a state in which the blow nozzle engages with a mouth part of the preform; and a headspace formation step of forming a headspace in the liquid-containing container, by operating the pressurized liquid supply source in a suction direction to discharge the liquid from inside the liquid-containing container through the supply path, thereafter closing the supply path, and discharging the liquid from inside the liquid-containing container through the discharge port of the discharge rod extending into the liquid-containing container through the blow nozzle.

In the liquid-containing container manufacturing method according to this embodiment, in the headspace formation step, the pressurized liquid supply source is operated in the suction direction to discharge the liquid from inside the liquid-containing container through the discharge port of the discharge rod.

In the liquid-containing container manufacturing method according to this embodiment, in the headspace formation step, pressurized gas is introduced into the liquid-containing container to discharge the liquid from inside the liquid-containing container through the discharge port of the discharge rod.

The liquid-containing container manufacturing method according to this embodiment further comprises a rod purge step of emitting the liquid from the discharge port of the discharge rod, in the liquid inside the preform before and/or during molding into the liquid-containing container.

In the liquid-containing container manufacturing method according to this embodiment, in the rod purge step, a whole amount of the liquid discharged from inside the liquid-containing container through the discharge port in the headspace formation step performed previously is emitted from the discharge port.

In the liquid-containing container manufacturing method according to this embodiment, in the rod purge step, the liquid is emitted from the discharge port of the discharge rod, in the liquid.

The liquid-containing container manufacturing method according to this embodiment further comprises an air discharge step of discharging air inside the preform to outside by supplying the liquid into the preform, before the liquid blow molding step.

In the liquid-containing container manufacturing method according to this embodiment, an amount of the liquid discharged from inside the liquid-containing container through the discharge port in the headspace formation step is less than or equal to an inner volume of the discharge path.

The liquid-containing container manufacturing method according to this embodiment further comprises a rod stretching step of stretching the preform in an axial direction by a stretching rod, during the liquid blow molding step, wherein the discharge rod is the stretching rod.

Such a liquid-containing container manufacturing method according to this embodiment can be implemented, for example, using a liquid-containing container manufacturing device 1 of a structure illustrated in FIG. 1.

The liquid-containing container manufacturing device 1 illustrated in FIG. 1 manufactures a liquid-containing container C (see FIG. 4) containing a content liquid from a synthetic resin-made preform 2. A liquid (content liquid) L contained in the liquid-containing container C may be any of various liquids L such as beverages, cosmetics, medicines, detergents, and toiletries such as shampoos.

The preform 2 is, for example, made of a thermoplastic synthetic resin material such as polypropylene (PP) or polyethylene terephthalate (PET), and shaped like a bottomed cylinder having a cylindrical mouth part 2a forming an open end and a cylindrical barrel part 2b connected to the mouth part 2a and closed at its lower end.

Although not specifically illustrated, the outer wall surface of the mouth part 2a has an engaging protrusion for attaching a closure cap (not illustrated) to the mouth part 2a of the molded liquid-containing container C by capping (undercut engagement). Instead of the engaging protrusion, the outer wall surface of the mouth part 2a may have an external thread to attach a closure cap to the mouth part 2a by screw connection.

The liquid-containing container manufacturing device 1 includes a mold 10 for blow molding. The mold 10 for blow molding has a cavity 11 whose shape corresponds to the final shape of the liquid-containing container C such as a bottle shape. The cavity 11 is open upward at the upper surface of the mold 10 for blow molding. The preform 2 is placed in the mold 10 for blow molding with the barrel part 2b being located inside the cavity 11 of the mold 10 for blow molding and the mouth part 2a projecting upward from the mold 10 for blow molding.

The mold 10 for blow molding is openable right and left. By opening the mold 10 for blow molding right and left after molding the preform 2 into the liquid-containing container C, the liquid-containing container C can be taken out of the mold 10 for blow molding.

A nozzle unit 20 for supplying the pressurized liquid L into the preform 2 is provided above the mold 10 for blow molding. The nozzle unit 20 includes a main block 21.

A support block 22 is provided at the lower end of the main block 21. The support block 22 supports a blow nozzle 23 attached to the lower end of the main block 21. The blow nozzle 23 is approximately cylindrical, and has a liquid supply port 23a on the inner side of its lower end. The main block 21, the support block 22, and the blow nozzle 23 constitute a nozzle unit body 20a. The nozzle unit body 20a is movable in the vertical direction relative to the mold 10 for blow molding. When the nozzle unit body 20a is lowered to the lower stroke end, the nozzle unit body 20a (more specifically, the blow nozzle 23) engages with the mouth part 2a of the preform 2 placed in the mold 10 for blow molding from above in a sealing state.

A vertical flow path 24 extending to the liquid supply port 23a of the blow nozzle 23 is formed inside the nozzle unit body 20a (more specifically, the main block 21 and the blow nozzle 23). The vertical flow path 24 extends in the vertical direction.

The nozzle unit body 20a (more specifically, the main block 21) also has a supply port 25 communicating with the upper end of the vertical flow path 24.

The nozzle unit body 20a (more specifically, the blow nozzle 23) has an annular (ring-shaped) seat part 24a provided in the vertical flow path 24. The annular seat part 24a is formed by the upper surface of the blow nozzle 23. The annular seat part 24a may be formed by the inner peripheral surface of the blow nozzle 23, or formed by the upper surface and the inner peripheral surface of the blow nozzle 23. The annular seat part 24a is formed by a tapered surface shaped like a downward-pointing cone, although the shape of the annular seat part 24a may be changed as appropriate. A seal body 26 for opening and closing the vertical flow path 24 (its seat part 24a) is placed inside the vertical flow path 24. The seal body 26 is cylindrical, and has a tapered surface 26a shaped like a downward-pointing cone at its lower end. When the seal body 26 moves to a closed position which is the lower stroke end position, the tapered surface 26a comes into contact with the upper surface of the blow nozzle 23 (i.e. the seat part 24a), to close the vertical flow path 24 (its seat part 24a). Although the tapered surface 26a is provided at the lower end of the seal body 26, its position can be changed as appropriate. Although the tapered surface 26a is shaped like a downward-pointing cone, its shape can be changed as appropriate. When the seal body 26 moves upward from the closed position, the lower end surface of the seal body 26 separates from the upper surface of the blow nozzle 23 (i.e. the seat part 24a), to open the vertical flow path 24 (its seat part 24a).

The seal body 26 is movable between the closed position at which the vertical flow path 24 (its seat part 24a) is closed and an open position at which the vertical flow path 24 (its seat part 24a) is open at a maximum degree of opening, that is, a degree of opening maximum in the liquid blow molding step. More specifically, the seal body 26 is movable among the closed position (see FIG. 1), a preliminary open position (see FIG. 2), and the open position (see FIG. 4). At the preliminary open position, the degree of opening of the seal body 26 that opens/closes the vertical flow path 24 (its seat part 24a) is lower than the degree of opening at the open position. Preferably, the effective cross-sectional area of the vertical flow path 24 at the preliminary open position is less than or equal to 10% of the effective cross-sectional area of the vertical flow path 24 at the open position. As illustrated in FIG. 1, the seal body 26 is fixed to a shaft body 27 that is movable in the vertical direction relative to the nozzle unit body 20a, and is movable in the vertical direction inside the vertical flow path 24. The seal body 26 may be formed integrally with the shaft body 27.

The nozzle unit 20 has a discharge rod 28 having a discharge port 28a. The discharge rod 28 made of a steel material or the like and having an approximately columnar shape extends along the axial center of each of the shaft body 27 and the seal body 26. The discharge rod 28 is movable in the vertical direction relative to the shaft body 27 and the seal body 26 when driven by a drive source (not illustrated). The discharge port 28a communicates with a first piping P1 via a hollow part of the discharge rod 28 (not illustrated). More specifically, the lower end of the hollow part of the discharge rod 28 communicates with the discharge port 28a, and the upper end of the hollow part of the discharge rod 28 communicates with the first piping P1. A rod valve V1 is provided in the first piping P1. The first piping P1 can be opened and closed by this rod valve V1. The rod valve V1 is preferably an electromagnetic valve controllable by the control device. In this embodiment, the lower end of the discharge rod 28 is closed, and the discharge port 28a is provided at the peripheral wall of the discharge rod 28. Therefore, when returning the discharge rod 28 to the original position after the formation of the headspace HS (see FIG. 7) in the container C, liquid dripping is prevented. The discharge rod 28 is, however, not limited to such a structure, and the discharge port 28a may be provided at the lower end surface of the discharge rod 28 or at both the lower end surface and the peripheral wall of the discharge rod 28.

The discharge rod 28 may be used as a stretching rod, as in this embodiment. As a result of the discharge rod 28 moving downward, the preform 2 can be stretched in the axial direction.

Figure 2:
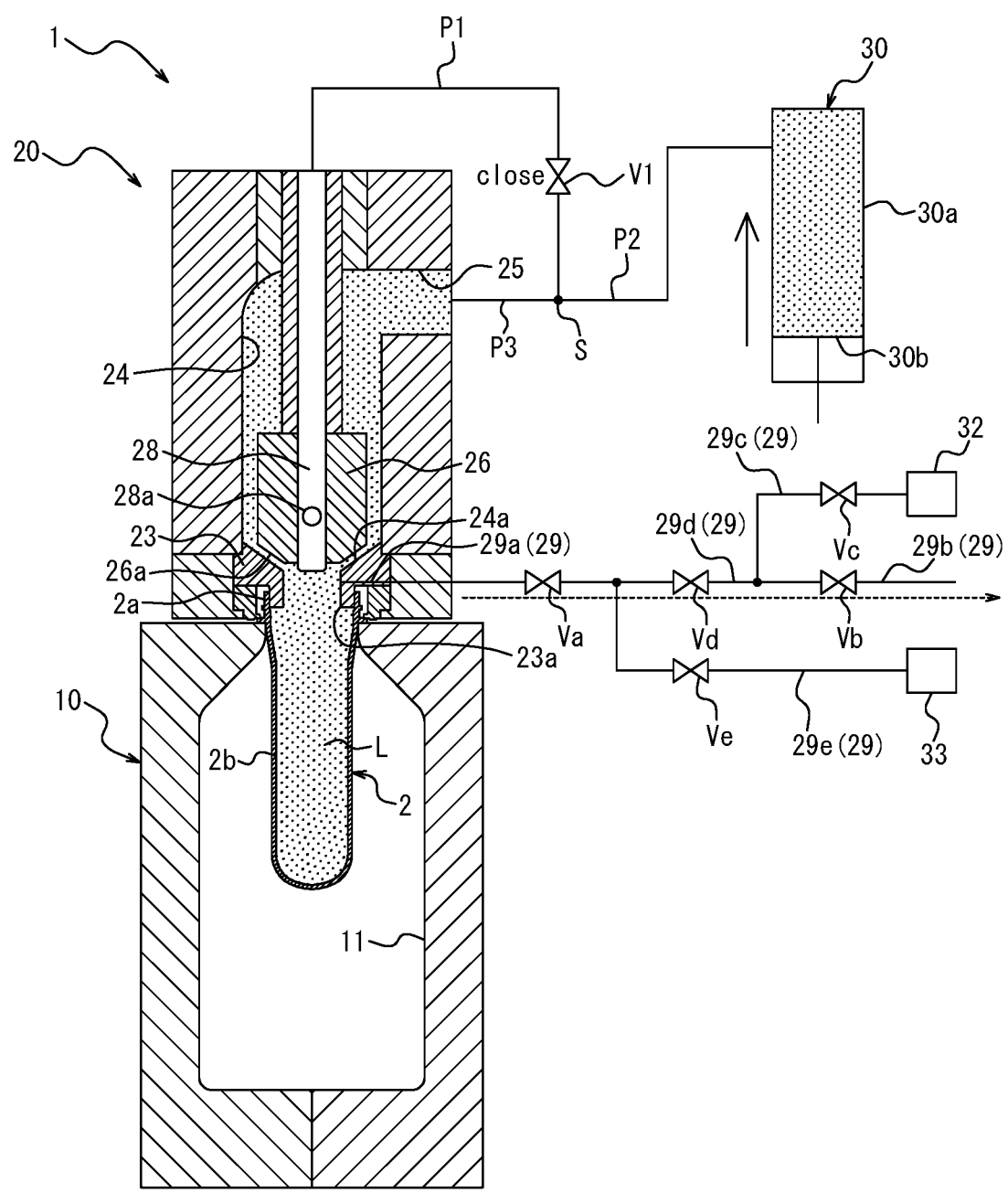
FIG. 2 is an explanatory diagram illustrating the liquid-containing container manufacturing device in a state in which an air discharge step is performed.
Figure 3:
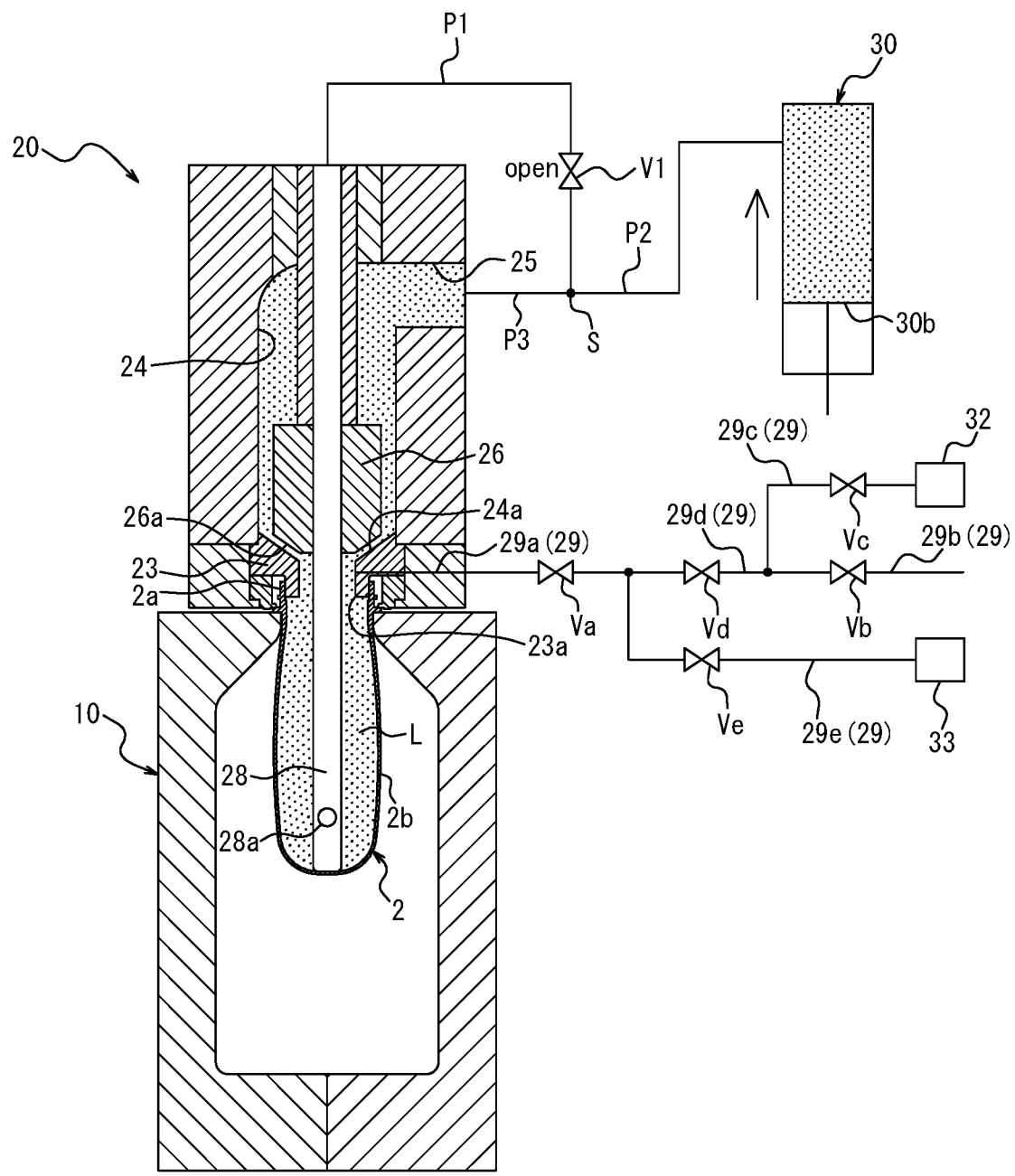
FIG. 3 is an explanatory diagram illustrating the liquid-containing container manufacturing device in a state in which a rod purge step and a liquid blow molding step are performed.
Figure 4:
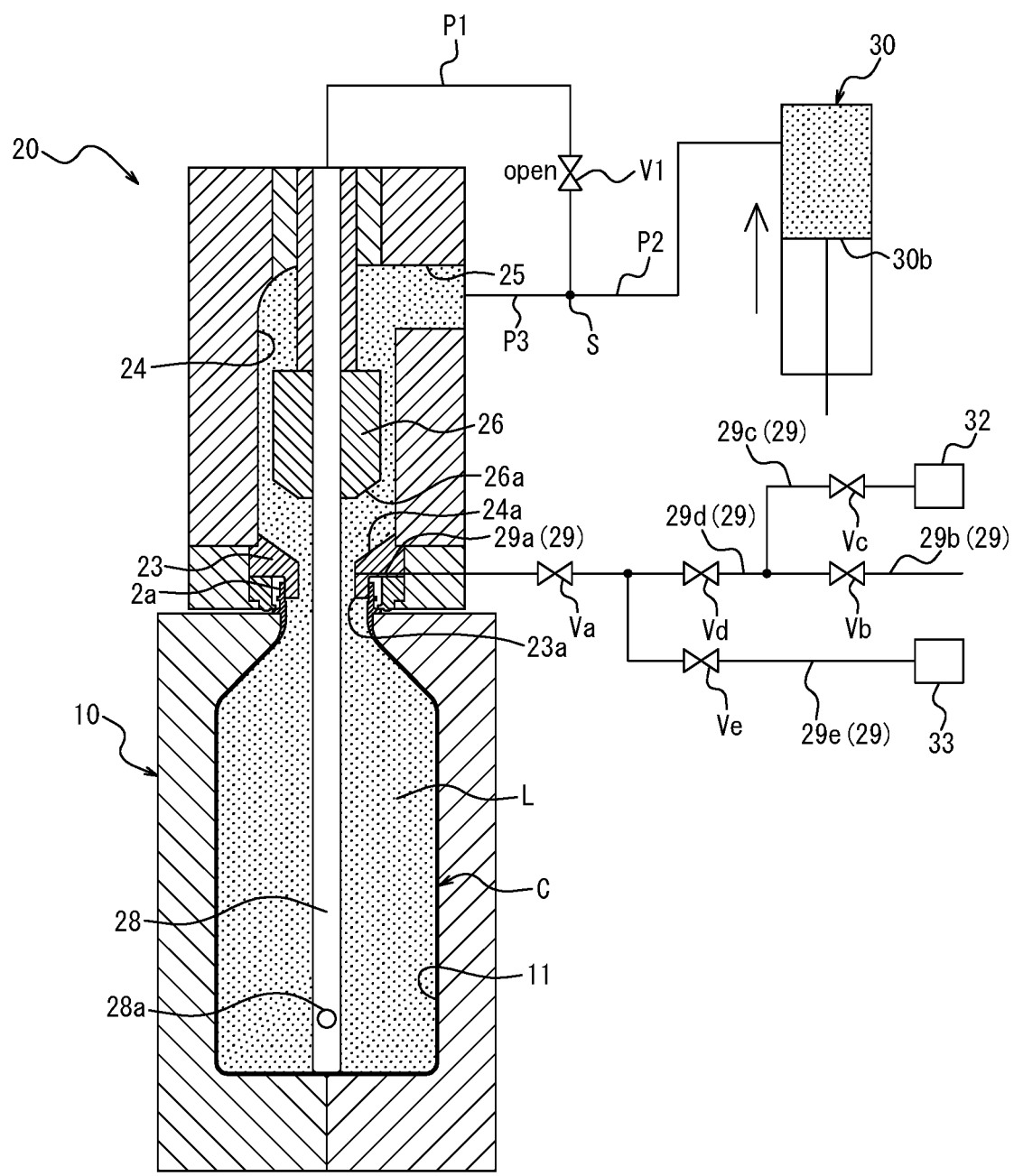
FIG. 4 is an explanatory diagram illustrating the liquid-containing container manufacturing device upon completion of the liquid blow molding step.
Figure 7:
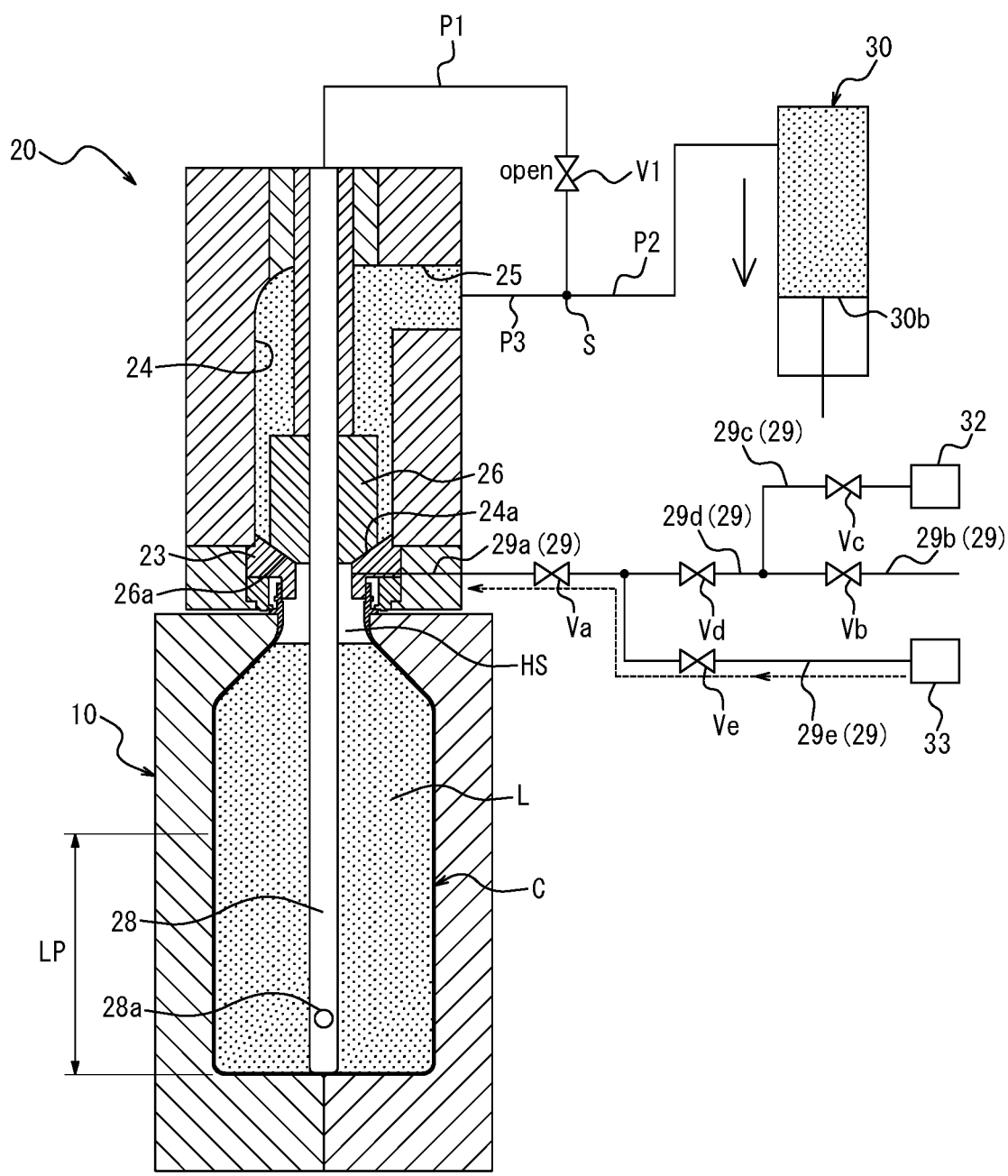
FIG. 7 is an explanatory diagram illustrating the liquid-containing container manufacturing device in a state in which second-stage suck back is started from the state in FIG. 6 and a headspace is formed in the headspace formation step.
Figure 8:
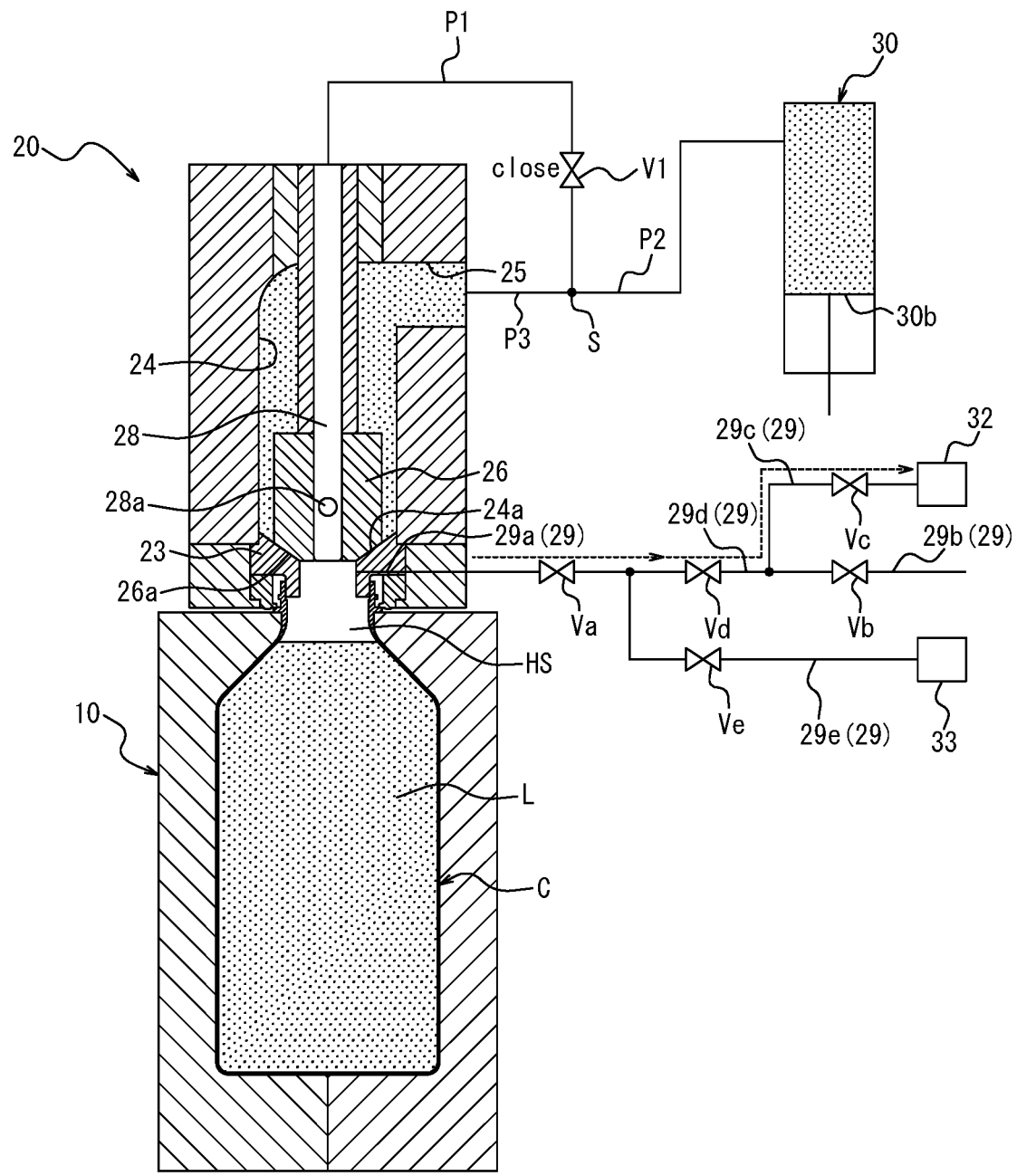
FIG. 8 is an explanatory diagram illustrating the liquid-containing container manufacturing device in a state in which a rod raising/depressurization step is performed.

A flow path 29 in which the liquid L and/or gas (air in this embodiment) flows is provided inside the nozzle unit 20 (its nozzle unit body 20a). The flow path 29 is configured to select one of: a suction state in which an opening 31 located in a part (the inner peripheral surface of the blow nozzle 23 in this embodiment) downstream from the seat part 24a in the below-described supply path (the supply path is made up of a third piping P3, the supply port 25, and the vertical flow path 24) is connected to a suction source 32 capable of sucking the liquid L in the flow path 29; a pressurized state in which the opening 31 is connected to a pressurized gas supply source 33 capable of supplying pressurized gas (air in this embodiment); an atmosphere open state in which the opening 31 is connected to the atmosphere; and a closed state in which the opening 31 is disconnected from the suction source 32, the pressurized gas supply source 33, and the atmosphere. As illustrated in FIGS. 1 and 8, as a result of the flow path 29 being in the suction state, liquid dripping from the blow nozzle 23 can be prevented. For example, in the case where the content liquid is a liquid that does not drip easily or liquid dripping causes no problem, the flow path 29 needs not be set to the suction state (the third path 29c and the suction source 32 may be omitted). As illustrated in FIG. 2, as a result of the flow path 29 being in the atmosphere open state, air can be discharged from inside the preform 2 to the atmosphere (outside) through the flow path 29 in the air discharge step. Depending on the conditions, the path 29 may be set to, instead of the atmosphere open state, the suction state to discharge air from inside the preform 2 in the air discharge step. As illustrated in FIGS. 3 and 4, as a result of the flow path 29 being in the closed state, the pressurized liquid L can be stably supplied into the preform 2 in the liquid blow molding step. As illustrated in FIG. 7, as a result of the flow path 29 being in the pressurized state, when discharging the liquid L from inside the preform 2 through the discharge port 28a of the discharge rod 28 in a headspace formation step, pressurized gas (air) can be supplied into the preform 2 to facilitate or aid the discharge of the liquid L. The suction source 32 can be formed, for example, by a suction pump or the like. The pressurized gas supply source 33 can be formed, for example, by a pressure pump or the like. The suction source 32 and the pressurized gas supply source 33 may be formed by a suction/pressure pump (e.g. a plunger pump such as a pressurized liquid supply source 30) that integrates a suction pump and a pressure pump. The flow path 29 may be wholly or partly provided inside the nozzle unit 20 (its nozzle unit body 20a).

In this embodiment, the flow path 29 has a first path 29a provided with a first valve Va, a second path 29b provided with a second valve Vb, a third path 29c provided with a third valve Vc, a fourth path 29d provided with a fourth valve Vd, and a fifth path 29e provided with a fifth valve Ve, as illustrated in FIG. 1. The first path 29a has one end connected to the opening 31, and the other end connected to a first branch 34. The second path 29b has one end connected to a second branch 35, and the other end open to the atmosphere. The third path 29c has one end connected to a second branch 35, and the other end connected to the suction source 32. The fourth path 29d has one end connected to the first branch 34, and the other end connected to the second branch 35. The fifth path 29e has one end connected to the first branch 34, and the other end connected to the pressurized gas supply source 33. The first valve Va to the fifth valve Ve are preferably electromagnetic valves.

The supply port 25 is connected to the pressurized liquid supply source 30 through a second piping P2. The pressurized liquid supply source 30 can be formed, for example, by a plunger pump including a cylinder 30a and a piston (plunger) 30b.

The pressurized liquid supply source 30 can supply the pressurized liquid L into the preform 2 through the second piping P2, the third piping P3, the supply port 25, and the vertical flow path 24 (its seat part 24a and liquid supply port 23a), by operating in the forward direction (pressurization direction) in a state in which the blow nozzle 23 engages with the mouth part 2a of the preform 2 placed in the mold 10 for blow molding in a sealing state and the seal body 26 opens the vertical flow path 24, as illustrated in FIGS. 3 and 4. The second piping P2 branches at a branch S into the first piping P1 and the third piping P3. The nozzle unit 20 has a common path formed by the second piping P2 extending from the pressurized liquid supply source 30 to the branch S, a supply path formed by the third piping P3 extending from the branch S to the supply port 25, the supply port 25, and the vertical flow path 24, and a discharge path (including the first piping P1) extending from the branch S to the discharge port 28a of the discharge rod 28.

The pressurized liquid supply source 30 can discharge the liquid L from inside the liquid-containing container C into the discharge path from the discharge port 28a to the branch S through the discharge port 28a of the discharge rod 28, by operating in the backward direction in a state in which the seal body 26 closes the vertical flow path 24 and the rod valve V1 is open, as illustrated in FIG. 7.

The pressurized liquid supply source 30 can suck the liquid L contained in a supply tank (not illustrated) into the cylinder 30a to prepare for the next liquid blow molding, by operating in the backward direction in a state in which the seal body 26 closes the vertical flow path 24 and the rod valve V1 is closed.

The operations of the nozzle unit body 20a, the seal body 26, the discharge rod (stretching rod) 28, the pressurized liquid supply source 30 (plunger 30b), the rod valve V1, the first valve Va to the fifth valve Ve, the suction source 32, the pressurized gas supply source 33, etc. are controlled by a control device (not illustrated) in an integrated manner.

A method (liquid-containing container manufacturing method according to this embodiment) of molding, from the synthetic resin-made preform 2, the liquid-containing container C which is a container of a predetermined shape containing the liquid (content liquid) L using the liquid-containing container manufacturing device 1 having such a structure will be described below.

A standby step is performed first. In the standby step, the preform 2 preheated to such a predetermined temperature (e.g. 80° C. to 150° C.) at which stretchability is developed using a heating means such as a heater (not illustrated) is placed in the mold 10 for blow molding and the mold 10 for blow molding is clamped.

At this time, the nozzle unit 20 is above and separate from the mold 10 for blow molding, and the seat part 24a is closed by the seal body 26, as illustrated in FIG. 1. Moreover, the flow path 29 is in the suction state. More specifically, the first valve Va is open, the second valve Vb is closed, the third valve Vc is open, the fourth valve Vd is open, and the fifth valve Ve is closed. Here, the mouth part 2a of the preform 2 is open, and accordingly the preform 2 is filled with air.

In this embodiment, an air discharge step is performed next. As illustrated in FIG. 2, in the air discharge step, in a state in which the nozzle unit 20 is lowered to cause the blow nozzle 23 to engage with the mouth part 2*a* of the preform 2 and the flow path 29 is in the atmosphere open state, the seal body 26 is moved to the preliminary open position and the plunger 30*b* is operated in the forward direction at a first speed (i.e. at a first pressure) to supply the liquid L from the vertical flow path 24 (supply path) into the preform 2, thus discharging air inside the preform 2 to the atmosphere (outside) through the flow path 29. That is, by supplying the liquid L into the preform 2, most of the air filling the preform 2 is forced out of the preform 2, i.e. discharged, by the liquid L. Here, in the flow path 29, the first valve Va is open, the second valve Vb is open, the third valve Vc is closed, the fourth valve Vd is open, and the fifth valve Ve is closed. The first speed in the air discharge step is preferably set to such a speed that does not substantially stretch (expand) the preform.

After the completion of the air discharge step, a liquid blow molding step is performed. In the liquid blow molding step, in a state in which the blow nozzle 23 engages with the mouth part 2*a* of the preform 2, the pressurized liquid L is supplied from the vertical flow path 24 (supply path) into the preform 2 by the pressurized liquid supply source 30, to mold the preform 2 into the liquid-containing container C of the shape along the cavity 11 of the mold 10 for blow molding.

In this embodiment, a rod purge step is performed at the start of the liquid blow molding step, as illustrated in FIG. 3. In the rod purge step, first, the flow path 29 is set to the closed state, and the rod valve V1 is opened. Following this, while holding the seal body 26 in the preliminary open position, the plunger 30*b* is operated in the forward direction at a second speed higher than the first speed (i.e. at a second pressure higher than the first pressure), to emit the liquid L from the discharge port 28*a* of the discharge rod 28, in the liquid L inside the preform 2 before and/or during molding into the liquid-containing container C. In this embodiment, in the rod purge step and the liquid blow molding step, the first valve Va to the fifth valve Ve are all closed. Alternatively, the third valve Vc may be open beforehand in preparation for a rod raising/depressurization step. The fifth valve Ve may be open beforehand in preparation for second-stage suck back in the headspace formation step.

Some amount of air may mix into the liquid L discharged from the discharge port 28*a* of the discharge rod 28 in the previous headspace formation step, due to vertical movement of the discharge rod 28 and the like. If such air returns to the vertical flow path 24 (supply path) and accumulates each time a container C is molded, the stability of molding conditions (such as the pressure to the liquid L in liquid blow molding), the container moldability, etc. are likely to decrease. By performing the rod purge step to emit, into the preform 2, the liquid L (preferably the whole amount) discharged from the discharge port 28*a* of the discharge rod 28 in the previous headspace formation step, such accumulation of air can be prevented. Moreover, since the amount of air supplied into the preform 2 in the rod purge step is slight, its effect on moldability is negligible. In the rod purge step, the emission of the liquid L from the discharge port 28*a* is performed in the liquid L inside the preform 2. This can suppress bubbling inside the preform 2.

In this embodiment, the rod purge step is performed by operating the plunger 30*b* in the forward direction at the second speed while holding the seal body 26 in the preliminary open position. Alternatively, the plunger 30*b* may be operated in the forward direction at the second speed, while or after moving the seal body 26 to the open position. For more stable emission from the discharge port 28*a* in the rod purge step, it is preferable to move the seal body 26 to the closed position and then open the rod valve V1 and operate the plunger 30*b* in the forward direction (e.g. at the second speed). Alternatively, an open/close valve may be provided in the third piping P3. In this case, the open/close valve is closed and the rod valve V1 is opened (the seal body 26 may be held in the preliminary open position, or moved to the open position), to operate the plunger 30*b* in the forward direction (e.g. at the second speed).

In the liquid blow molding step, after the completion of the rod purge step, the seal body 26 is raised from the preliminary open position toward the open position while operating the plunger 30*b* in the forward direction at the second speed, to supply the liquid L pressurized to the second pressure from the vertical flow path 24 (supply path) into the preform 2 through the seat part 24*a*. As a result, the preform 2 is molded into the liquid-containing container C of the shape along the cavity 11 of the mold 10 for blow molding, as illustrated in FIG. 4.

This liquid blow molding step is performed in a state in which most of the air inside the preform 2 has been discharged to the outside as a result of the air discharge step. Therefore, when the pressurized liquid L is supplied into the preform 2, the liquid L does not entrain air, and thus mixing of air into the liquid L inside the liquid-containing container C is prevented.

In this embodiment, a rod stretching step is performed during the liquid blow molding step, as illustrated in FIGS. 3 and 4. In the rod stretching step, the stretching rod 28 moving downward stretches the barrel part 2*b* of the preform 2 in the axial direction (longitudinal direction). The rod stretching step may be performed before the liquid blow molding step. By performing the liquid blow molding step after or during the rod stretching step (the rod stretching step may be started after the start of the liquid blow molding step), biaxial stretching blow molding, i.e. blow molding the preform 2 while stretching it in the axial direction by the stretching rod 28, can be carried out. Consequently, the preform 2 can be molded into the liquid-containing container C of the predetermined shape more accurately. Alternatively, the liquid blow molding step may be performed without the rod stretching step. FIG. 1 illustrates a state in which the stretching rod 28 is at the original position. The lower end surface of the stretching rod 28 need not be at the height illustrated in FIG. 1 in the original position, and may be above or below the height.

Figure 5:
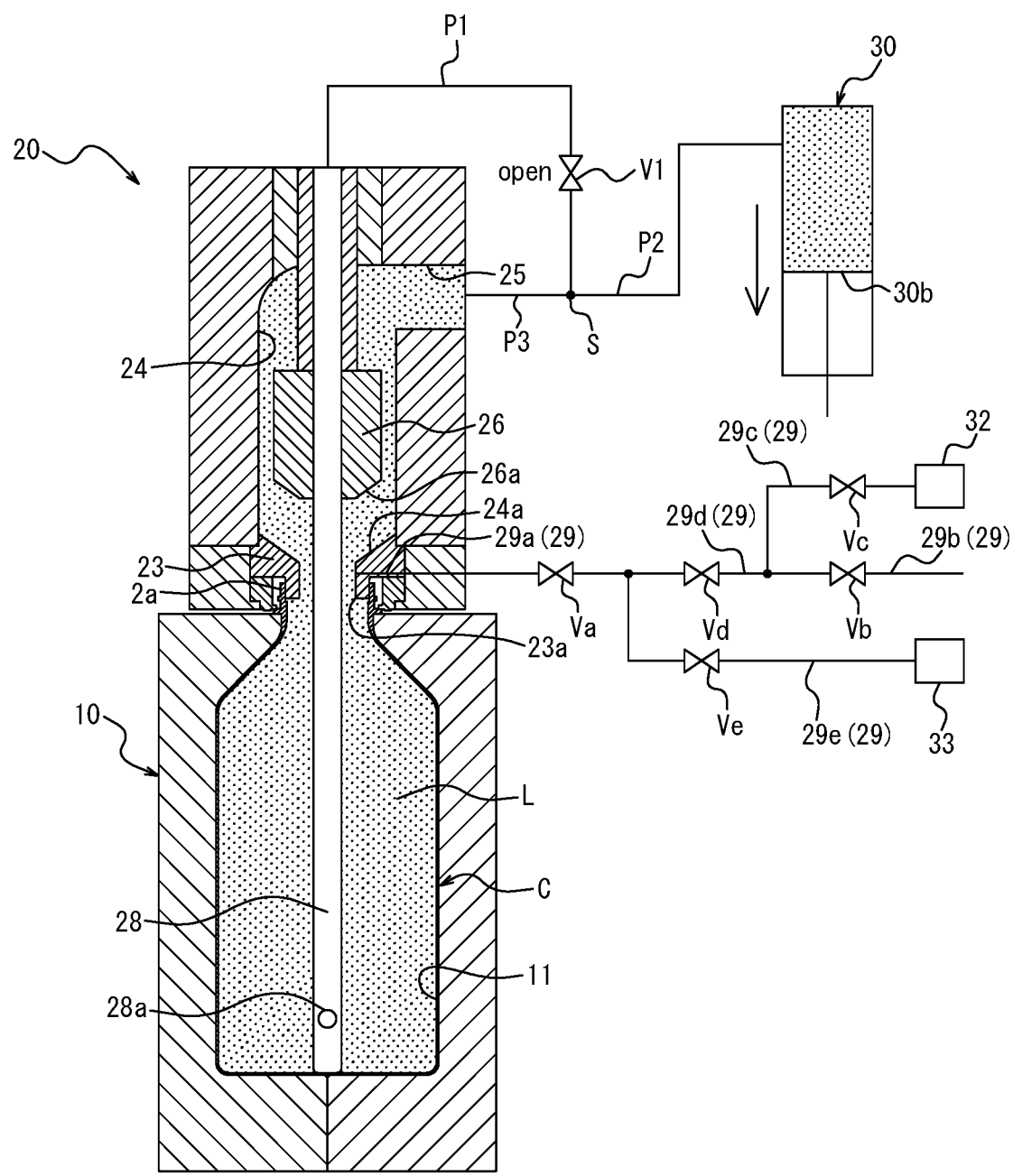
FIG. 5 is an explanatory diagram illustrating the liquid-containing container manufacturing device in a state in which first-stage suck back is performed in a headspace formation step.

After the completion of the liquid blow molding step, a headspace formation step is performed. In this embodiment, in the headspace formation step, first-stage suck back is performed first (i.e. the pressurized liquid supply source 30 is operated in the suction direction to discharge the liquid L from inside the liquid-containing container C through the supply path), as illustrated in FIG. 5. In the first-stage suck back, while the seal body 26 is in the open position, the flow path 29 is in the closed state, and the rod valve V1 remains open (or the rod valve V1 may be closed), the plunger 30*b* is operated in the backward direction (suction direction) by a predetermined operation amount to suck a predetermined amount of the liquid L from inside the molded liquid-containing container C back into the vertical flow path 24 (supply path), as illustrated in FIG. 5. By the first-stage suck back, the positive pressure state inside the container C is cleared (the negative pressure state may be formed inside the container C). Accordingly, when the flow path 29 is turned into a pressurized state subsequently, the entry of the liquid L into the flow path 29 from inside the container C can be suppressed. Moreover, as a result of the first-stage suck back being performed through the vertical flow path 24 (supply path), the liquid L can be discharged faster than in the case where the liquid L is discharged only through the discharge port 28a of the discharge rod 28, and the positive pressure state inside the container C can be cleared speedily. The amount of the liquid L sucked by the first-stage suck back is preferably such a slight amount that minimizes the return of air, which has been mixed into the liquid L inside the molded container C, to the vertical flow path 24 (supply path).

Figure 6:
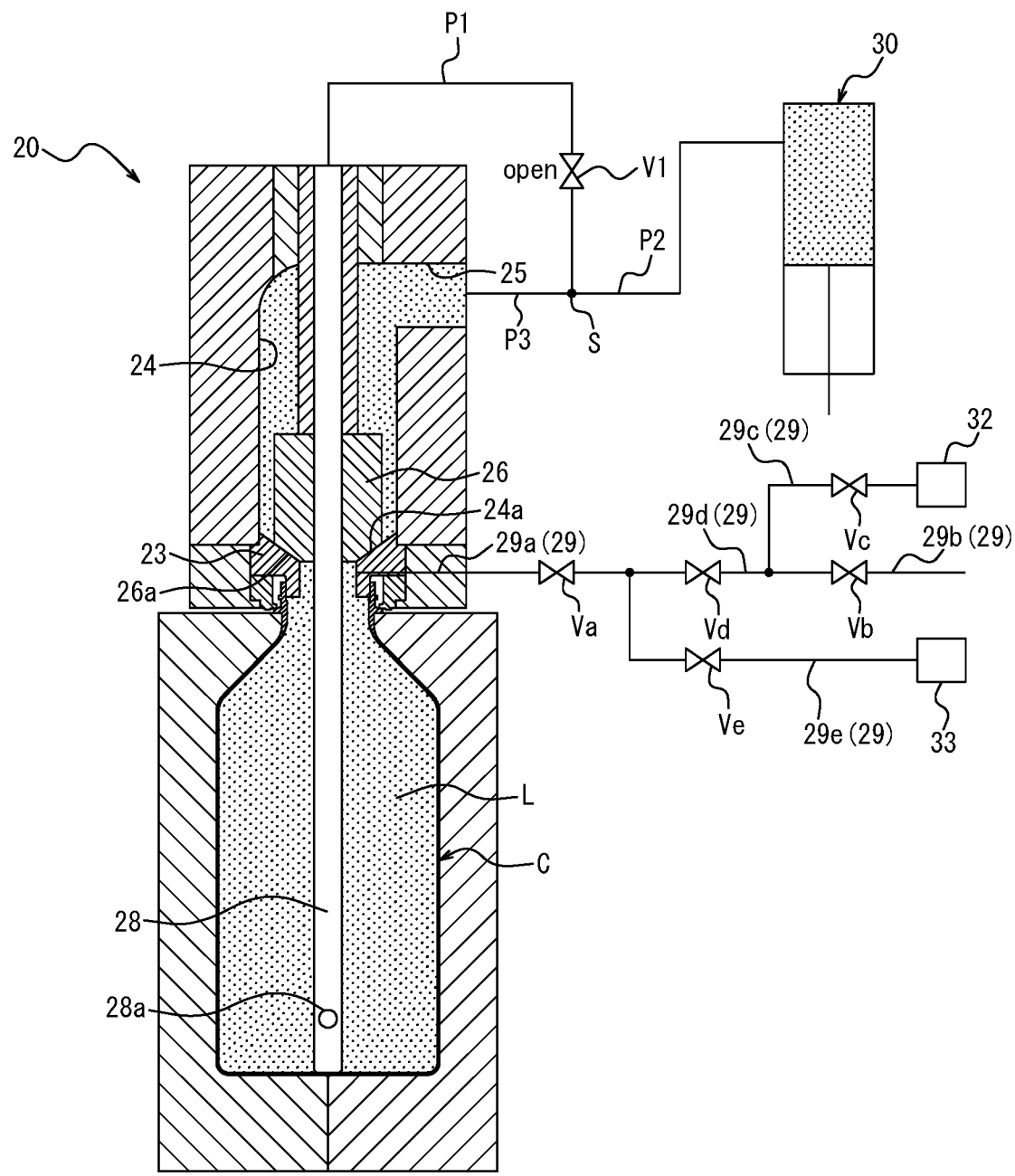
FIG. 6 is an explanatory diagram illustrating the liquid-containing container manufacturing device when the supply path is closed from the state in FIG. 5 in the headspace formation step.

In this embodiment, in the headspace formation step, after the completion of the first-stage suck back, the seal body 26 is moved to the closed position (see FIG. 6), the flow path 29 is set to the pressurized state, and second-stage suck back is performed (see FIG. 7). More specifically, in the flow path 29, the first valve Va is open, the second valve Vb is closed, the third valve Vc is closed, the fourth valve Vd is closed, and the fifth valve Ve is open, as illustrated in FIG. 7. Alternatively, the third valve Vc may be open beforehand in preparation for a rod raising/depressurization step. In the second-stage suck back, in a state in which the rod valve V1 is open and the vertical flow path 24 (supply path) is closed, the pressurized liquid supply source 30 (its plunger 30b) is operated in the suction direction to discharge the liquid L from inside the liquid-containing container C through the discharge port 28a of the discharge rod 28 extending into the liquid-containing container C through the blow nozzle 23, thus forming the headspace HS in the liquid-containing container C. In this embodiment, the second-stage suck back is performed while supplying pressurized gas into the preform 2 from the flow path 29, so that the discharge of the liquid L through the discharge port 28a is facilitated. This aid by the pressurized gas is particularly effective in the case where the viscosity of the liquid L as the content liquid is high. In the case where the liquid L can be discharged from the discharge port 28a without aid by pressurized gas, such as when the viscosity of the liquid L as the content liquid is low, the second-stage suck back may be performed with the flow path 29 being in the atmosphere open state (or the blow nozzle 23 being separated from the mouth part 2a of the container C to allow the atmosphere to be introduced from outside). In such a case where the second-stage suck back is performed while introducing gas into the preform 2, a larger headspace HS can be formed without deformation (permanent deformation) of the container C caused by formation of excessive negative pressure inside the container C, than in the case where, after setting the flow path 29 to the closed state and forming negative pressure inside the container C by the second-stage suck back, the flow path 29 is set to the atmosphere open state to form the headspace HS. However, after setting the flow path 29 to the closed state and forming negative pressure inside the container C by the second-stage suck back, the flow path 29 may be set to the atmosphere open state to form the headspace HS. In this case, the second-stage suck back may be performed simultaneously with the first-stage suck back (including partial overlap due to time difference). Instead of the second-stage suck back, the liquid L may be discharged through the discharge port 28a by only the pressurized gas from the flow path 29 (i.e. in a state in which the supply path is closed, the pressurized gas is introduced into the liquid-containing container C without operating the pressurized liquid supply source 30 in the suction direction, to discharge the liquid L from inside the liquid-containing container C through the discharge port 28a of the discharge rod 28), to form the headspace HS.

By discharging the liquid L through the discharge port 28a as in this embodiment, the liquid L can be discharged from a lower part having little mixing of air, than in the case where the liquid L is discharged through the vertical flow path 24 (its seat part 24a). Accordingly, when performing the rod purge step, it is not necessary to return the whole amount of the liquid L discharged through the discharge port 28a (such an amount for which mixing of air is expected may be returned). Particularly, in this embodiment, the liquid L is discharged from inside the liquid-containing container C through the discharge port 28a that is located in the lower half LP (the lower part when the height is vertically divided in half) of the liquid-containing container C having little mixing of air, as illustrated in FIG. 7. Alternatively, the liquid L may be discharged from inside the liquid-containing container C through the discharge port 28a that is located in the upper half of the liquid-containing container C. A plurality of discharge ports 28a may be arranged in the discharge rod 28 along the axial direction and/or the circumferential direction. The position of the discharge port 28a, the number of discharge ports 28a, the shape of the discharge port 28a, etc. may be set as appropriate depending on the, for example, the type and property of the liquid L.

In the headspace formation step, the amount of the liquid L discharged from inside the liquid-containing container C through the discharge port 28a is less than or equal to the inner volume of the discharge path. This can prevent the discharged liquid L from entering the supply path (the vertical flow path 24, the supply port 25, and the third piping P3) together with air. From this perspective, the amount of the liquid L discharged from inside the liquid-containing container C through the discharge port 28a in the headspace formation step is preferably less than or equal to the inner volume from the discharge port 28a to the rod valve V1 in the discharge path. In this embodiment, the pressurized liquid supply source 30 for pressurizing the supply path can also be used for the discharge, with it being possible to simplify the structure of the nozzle unit 20. Alternatively, the amount of the liquid L discharged from inside the liquid-containing container C through the discharge port 28a in the headspace formation step may be greater than the inner volume of the discharge path.

In this embodiment, after the completion of the headspace formation step, a rod raising/depressurization step is performed. In the rod raising/depressurization step, the discharge rod (stretching rod) 28 is raised and returned to the original position, as illustrated in FIG. 8. Moreover, the flow path 29 is set to the suction state, and the rod valve V1 is closed. Following this, the nozzle unit 20 is raised, and the liquid-containing container C is taken out of the mold 10 for blow molding. The pressurized liquid supply source 30 is then filled, and the process moves to the standby step illustrated in FIG. 1.

The present disclosure is not limited to the foregoing embodiment, and various changes can be made without departing from the scope of the present disclosure.

Although the foregoing embodiment describes the case where the liquid-containing container manufacturing method according to the present disclosure is carried out using the liquid-containing container manufacturing device 1 of the structure illustrated in FIG. 1, the liquid-containing container manufacturing method according to the present disclosure may be carried out using liquid-containing container manufacturing devices of other structures, etc.

Although the foregoing embodiment describes the case where the first-stage suck back is performed, the first-stage suck back may be omitted. Even in this case, by performing the rod purge step, accumulation of air in the vertical flow path 24 (supply path) can be prevented to suppress decreases in the stability of molding conditions, the container moldability, and the like, as described above.

Although the foregoing embodiment describes the case where the inside of the preform 2 is opened to the atmosphere by setting the flow path 29 to the atmosphere open state in a state in which the blow nozzle 23 engages with the mouth part 2a of the preform 2 in the air discharge step, the present disclosure is not limited to such. For example, the air discharge passage from the inside to the outside of the preform 2 may be secured without making the blow nozzle 23 engage with the mouth part 2a of the preform 2 in the air discharge step.

Although the foregoing embodiment describes the case where the pressurized liquid supply source 30 is a plunger pump, the present disclosure is not limited to such. Various structures, such as other types of pumps, may be used as long as the liquid L can be pressurized to predetermined pressure and supplied into the preform 2 and negative pressure for suck back of the liquid L can be formed.

Although the foregoing embodiment describes the case where, in the rod purge step, the liquid L is emitted from the discharge port 28a of the discharge rod 28 in the liquid L inside the preform 2 before and/or during molding into the liquid-containing container C, the present disclosure is not limited to such. For example, in the rod purge step, the emission of the liquid L from the discharge port 28a of the discharge rod 28 may be performed in air at all times. Although the foregoing embodiment describes the case where the emission of the liquid L from the discharge port 28a is performed in the liquid L inside the preform 2 at all times in the rod purge step, for example, the emission may be initially performed in air, and subsequently performed in the liquid L. A step of supplying the liquid L into the preform 2 beforehand by means other than the blow nozzle 23 may be provided before the rod purge step (e.g. before the standby step). Although the foregoing embodiment describes the case where the rod purge step is performed during the liquid blow molding step, the present disclosure is not limited to such. For example, the rod purge step may be performed before the liquid blow molding step (e.g. before or during the air discharge step, or between the air discharge step and the liquid blow molding step). In the rod purge step, the emission of the liquid L from the discharge port 28a of the discharge rod 28 may be performed in the liquid L inside the liquid-containing container C immediately after molding (before the first-stage suck back), depending on conditions. The rod purge step may be omitted.

Although the foregoing embodiment describes the case where the air discharge step is performed, the air discharge step may be omitted.

The preform 2 may be of any of various shapes depending on the shape of the molded liquid-containing container C and the like.

REFERENCE SIGNS LIST 1 liquid-containing container manufacturing device
2 preform
2a mouth part
2b barrel part
10 mold for blow molding
11 cavity
20 nozzle unit
20a nozzle unit body
21 main block
22 support block
23 blow nozzle
23a liquid supply port
24 vertical flow path
24a seat part
25 supply port
26 seal body
26a tapered surface
27 shaft body
28 discharge rod (stretching rod)
28a discharge port
29 flow path
30 pressurized liquid supply source
30a cylinder
30b piston (plunger)
31 opening
32 suction source
33 pressurized gas supply source
34 first branch
35 second branch
C liquid-containing container
L liquid
P1 first piping
P2 second piping
P3 third piping
S branch
V1 rod valve
Va to Ve first to fifth valves
HS headspace
LP lower half

The invention claimed is:

1. A liquid-containing container manufacturing method of manufacturing a liquid-containing container containing a content liquid from a synthetic resin-made preform using a nozzle unit and a mold for blow molding, the nozzle unit having a common path of a liquid extending from a pressurized liquid supply source to a branch, a supply path of the liquid extending from the branch to a blow nozzle, a discharge path of the liquid extending from the branch to a discharge port of a discharge rod, and a seal body to open and close a seat part provided in the supply path, the liquid-containing container manufacturing method comprising:
 a liquid blow molding step of molding the preform into the liquid-containing container of a shape along an inner surface of the mold for blow molding, by supplying the liquid pressurized by the pressurized liquid supply source from the supply path into the preform in a state in which the blow nozzle engages with a mouth part of the preform; and
 a headspace formation step of forming a headspace in the liquid-containing container, by operating the pressurized liquid supply source in a suction direction to discharge the liquid from inside the liquid-containing container through the seat part of the supply path, thereafter closing the seat part of the supply path by the seal body, and discharging the liquid from inside the liquid-containing container through the discharge port of the discharge rod extending into the liquid-containing container through the seal body and the blow nozzle.

2. The liquid-containing container manufacturing method according to claim 1, wherein in the headspace formation step, the pressurized liquid supply source is operated in the suction direction to discharge the liquid from inside the liquid-containing container through the discharge port of the discharge rod.

3. The liquid-containing container manufacturing method according to claim 1, wherein in the headspace formation step, pressurized gas is introduced into the liquid-containing container to discharge the liquid from inside the liquid-containing container through the discharge port of the discharge rod.

4. The liquid-containing container manufacturing method according to claim 1, further comprising
a rod purge step of emitting the liquid from the discharge port of the discharge rod, inside the preform before and/or during molding into the liquid-containing container.

5. The liquid-containing container manufacturing method according to claim 4, wherein in the rod purge step, a whole amount of the liquid discharged from inside the liquid-containing container through the discharge port in the headspace formation step performed previously is emitted from the discharge port.

6. The liquid-containing container manufacturing method according to claim 4, wherein in the rod purge step, the liquid is emitted from the discharge port of the discharge rod, in the liquid.

7. The liquid-containing container manufacturing method according to claim 1, further comprising
an air discharge step of discharging air inside the preform to outside by supplying the liquid into the preform, before the liquid blow molding step.

8. The liquid-containing container manufacturing method according to claim 1, wherein an amount of the liquid discharged from inside the liquid-containing container through the discharge port in the headspace formation step is less than or equal to an inner volume of the discharge path.

9. The liquid-containing container manufacturing method according to claim 1, further comprising
a rod stretching step of stretching the preform in an axial direction by a stretching rod, before or during the liquid blow molding step,
wherein the discharge rod is the stretching rod.

* * * * *